Figure 1:
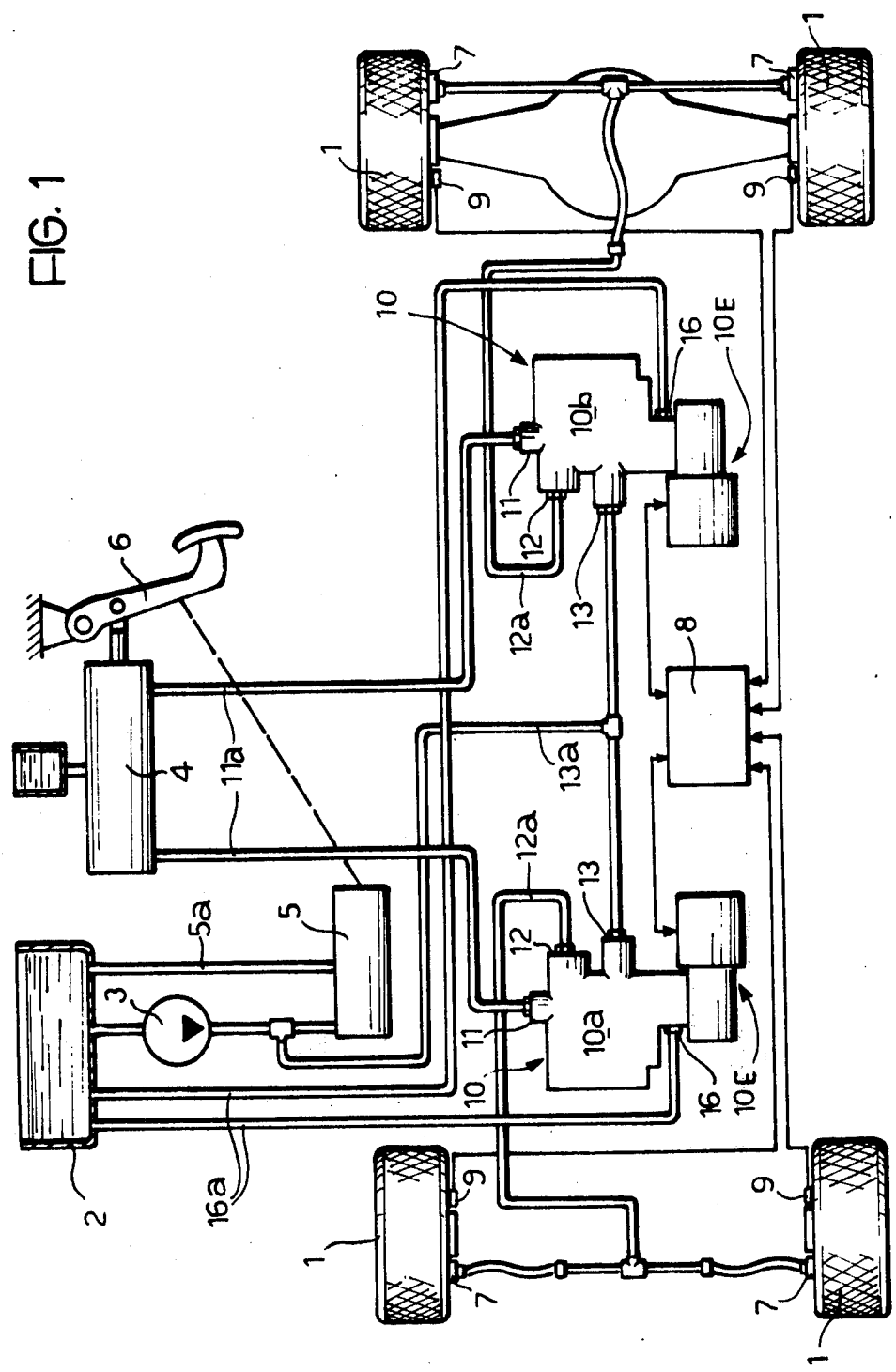

United States Patent [19]

Bertone et al.

[11] 4,033,638

[45] July 5, 1977

[54] HYDRO-DYNAMIC ANTI-SKID BRAKING SYSTEMS

[75] Inventors: Antonino Bertone, Sant'Antonino (Vercelli); Enrico Rivetti; Maurizio Cattaneo, both of Turin, all of Italy

[73] Assignee: Fiat Societa per Azioni, Turin, Italy

[22] Filed: Oct. 28, 1976

[21] Appl. No.: 736,637

[30] Foreign Application Priority Data

Nov. 7, 1975 Italy .................. 69751/75

[52] U.S. Cl. ........................ 303/116; 303/117
[51] Int. Cl.² ............................. B60T 8/10
[58] Field of Search .............. 188/181 A; 303/113, 303/115–117, 119

[56] References Cited

UNITED STATES PATENTS

| | | | |
|---|---|---|---|
| 3,286,734 | 11/1966 | Hartshorne | 303/117 X |
| 3,486,801 | 12/1969 | Frayer | 303/117 |
| 3,661,427 | 5/1972 | Hodge | 303/116 |
| 3,702,713 | 11/1972 | Oberthur | 303/117 |

*Primary Examiner*—Duane A. Reger

*Attorney, Agent, or Firm*—Sughrue, Rothwell, Mion, Zinn & Macpeak

[57] ABSTRACT

A hydro-dynamic brake system of the type having a volumetric pump circulating brake fluid to a reservoir, and a modulating valve in the output of the pump acting under the control of the brake pedal to constrict the pipeline thereby increasing the pressure at the output of the pump. This pressure is fed to a distributor controlled by a solenoid valve and also receiving an input directly from a master cylinder which is also controlled by the brake pedal. Each wheel has a speed sensor feeding a processing and control circuit which produces an output signal to a solenoid valve which controls various transfer ports of the distributor. The distributor has a series of cylindrical cavities housing pistons which control valves in passages linking the chambers into which each cavity is separated by its piston. These pistons control the flow of brake fluid to the brake actuators so that upon skidding the brakes are released in a rapid but controlled manner, and likewise reapplication of the brakes after skidding is progressive so that there is no "snatching" which might lead to a loss of control.

7 Claims, 8 Drawing Figures

HYDRO-DYNAMIC ANTI-SKID BRAKING SYSTEMS

The present invention relates to a hydro-dynamic braking system suitable for motor vehicles, and particularly to such a braking system provided with an anti-skidding device.

Hydro-dynamic braking systems include a volumetric pump circulating brake fluid to a reservoir and having in the output line of the pump means for restricting the flow of fluid to the reservoir under the control of the brake pedal whereby to increase the pressure of fluid at the pump output. This increase in pressure is used to control an hydraulic distributor which feeds brake fluid under pressure to the brake actuators of the wheels of the vehicle. Speed sensors are also associated with the wheels and feed a processing circuit which acts to detect the dynamic state of the wheels to produce an output signal if any of them enters a skid or incipient skid state. The output from the processing means controls the distributor to cut off the braking pressure to the brake actuators of at least the wheel in the skid or incipient skid state (more usually both the wheels of one axle).

Such systems have the disadvantage, however, of causing a temporary and sudden release of the brakes, in conditions of sudden skidding, by directly controlling the main braking circuit, and this can lead to harsh and rapid successive brake release and brake reapplication stages.

The present invention seeks to provide a braking system of the general type described above, in which the temporary release of the brakes takes place at a controlled rate, and the subsequent reapplication of the brakes is also gradual and progressive, and not harsh and sudden.

According to the present invention, there is provided a hydro-dynamic anti-skid braking system, for motor vehicles, of the type comprising a master cylinder controlled by a brake pedal and feeding brake fluid to at least one hydraulic distributor having four ports, a first port connected to the said master cylinder, a second port connected to the brake actuators of at least some of the wheels of the vehicle, a third port connected to the output side of a volumetric pump which operates to circulate brake fluid from a brake fluid reservoir through a modulating valve controlled by the brake pedal and back to the reservoir, and a fourth port connected directly to the reservoir, sensor means associated with each of the wheels of the vehicle for detecting the speed thereof and producing respective output signals which are fed to a processing circuit which produces an output signal whenever any of the wheels of the vehicle is in a skid or an incipient skid state, the output signal being fed to a solenoid valve of the hydraulic distributor whereby to energise the solenoid valve whenever one of the wheels of the vehicle is in a skid or incipient skid state, so as to control the distributor to release the brakes when a skid or incipient skid is detected, characterised in that the hydraulic distributor comprises a body having three transfer ports communicating with the solenoid valve which acts to connect the first and the second transfer ports together when de-energised and to connect the second and the third transfer ports together when energised, the hydraulic distributor body also having a first cavity housing a first piston which separates it into a first chamber communicating with the first and second ports, and a second chamber communicating with the third port and with the first transfer port to the solenoid valve, a second cavity, housing a second piston, which separates it into first and second chambers, the first communicating via a first control valve with the first chamber of the first cavity, and the second communicating with the second chamber of the first cavity, a third cavity housing a third piston separating it into first and second chambers the first communicating with both the first chamber of the second cavity and, via a second control valve with the first port, and the second communicating with the second transfer port to the solenoid valve via control means which permit a controlled flow of fluid from the said second chamber of the third cavity through the second and third transfer ports to the fourth port when the solenoid valve is energised, the first piston having a projection serving as a shutter to close communication between the first port and the first chamber of the first cavity when the pressure in the first chamber of the first cavity is lower than the pressure in the second chamber of the first cavity, the said first and second control valves acting to prevent the flow of fluid into the said first chambers of the second and third cavities respectively when the pressure in these is higher than the pressure in the second chambers of the second and third cavities respectively.

In a practical embodiment of the invention the control means comprises a fourth cavity in the body of the distributor housing a fourth piston which separates it into first and second chambers, the first chamber communicating with the second chamber of the third cavity and the second chamber communicating via a third control valve with the second transfer port to the solenoid valve, the third control valve operating to close such communication when the pressure in the second chamber of the fourth cavity exceeds by a predetermined amount the pressure in the first chamber of the fourth cavity.

Alternatively, the control means may comprise a differential piston having a larger part and a smaller part housed in a fourth cavity and separating it into three chambers, a first chamber at the larger end of the cavity, a second chamber of the same diameter as the first at an intermediate position of a shoulder between the larger and smaller parts of the cavity, and a third chamber at the smaller end of the cavity and communicating via a passage with the second transfer port to the solenoid valve, the differential piston being provided with a longitudinal passage permitting free communication between the two end chambers and a transverse duct of narrow cross section permitting throttled communication between the longitudinal passage and the intermediate chamber; the smaller end of the differential piston having means for closing the passage leading to the said second transfer port to the solenoid valve, the said intermediate chamber communicating freely with the second chamber of the third cavity, and via a fourth control valve with the second transfer port to the solenoid valve.

Figure 2:
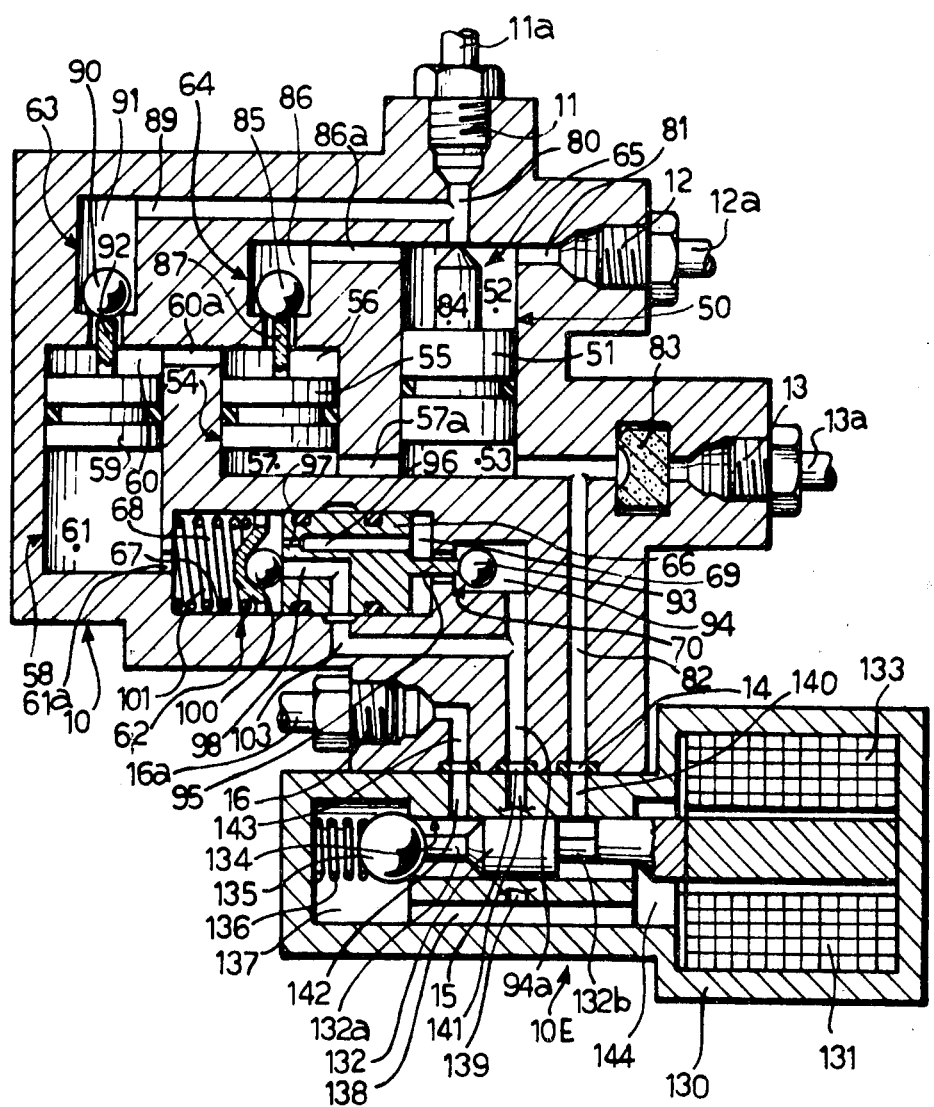
Figure 3:
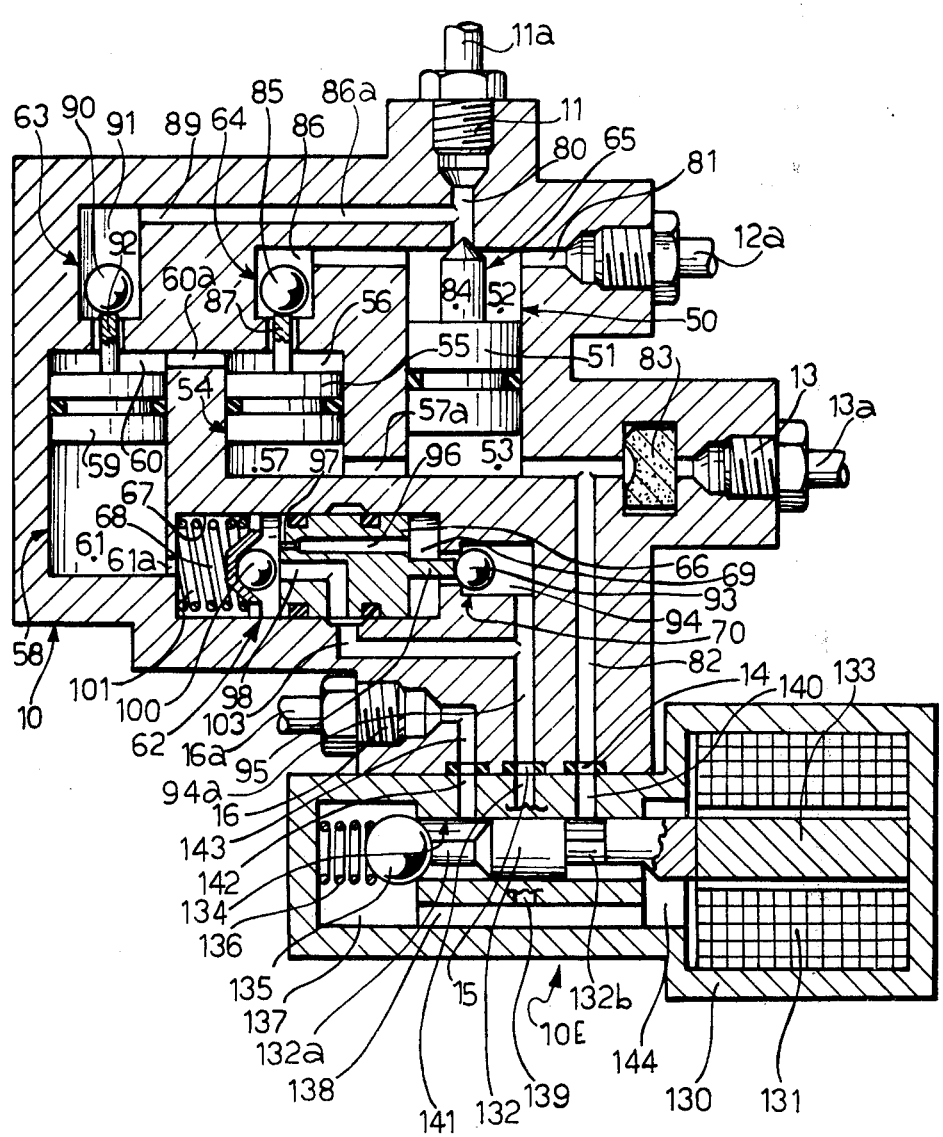
Figure 4:
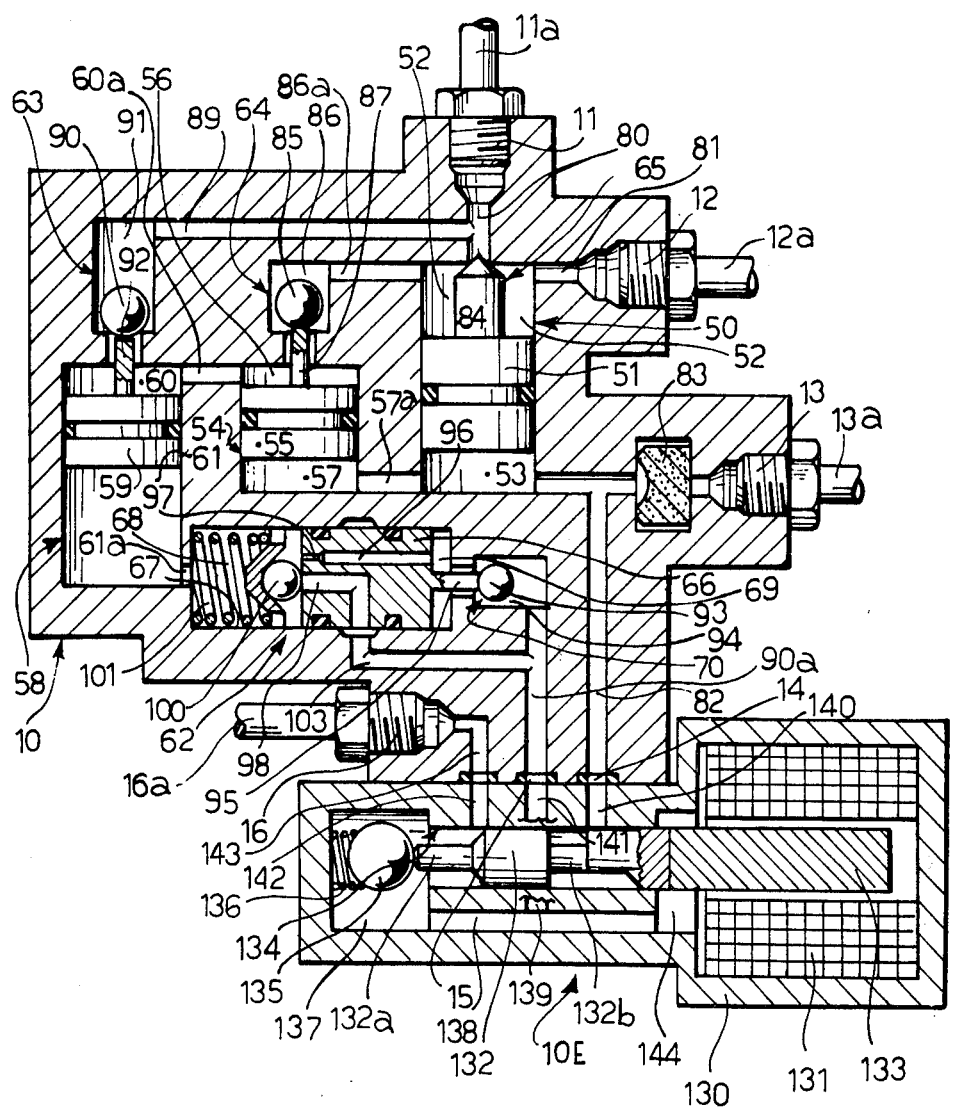
Figure 5:
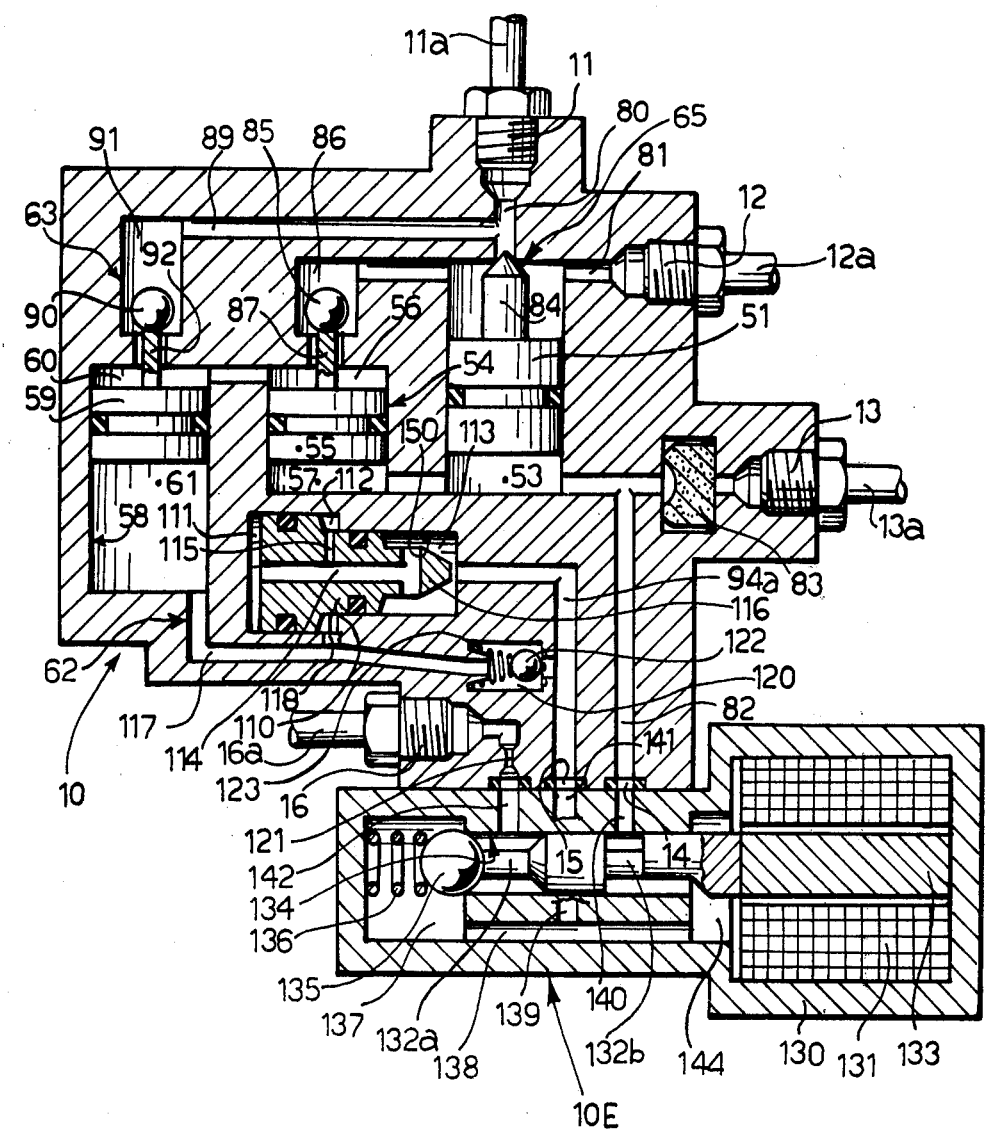
Figure 6:
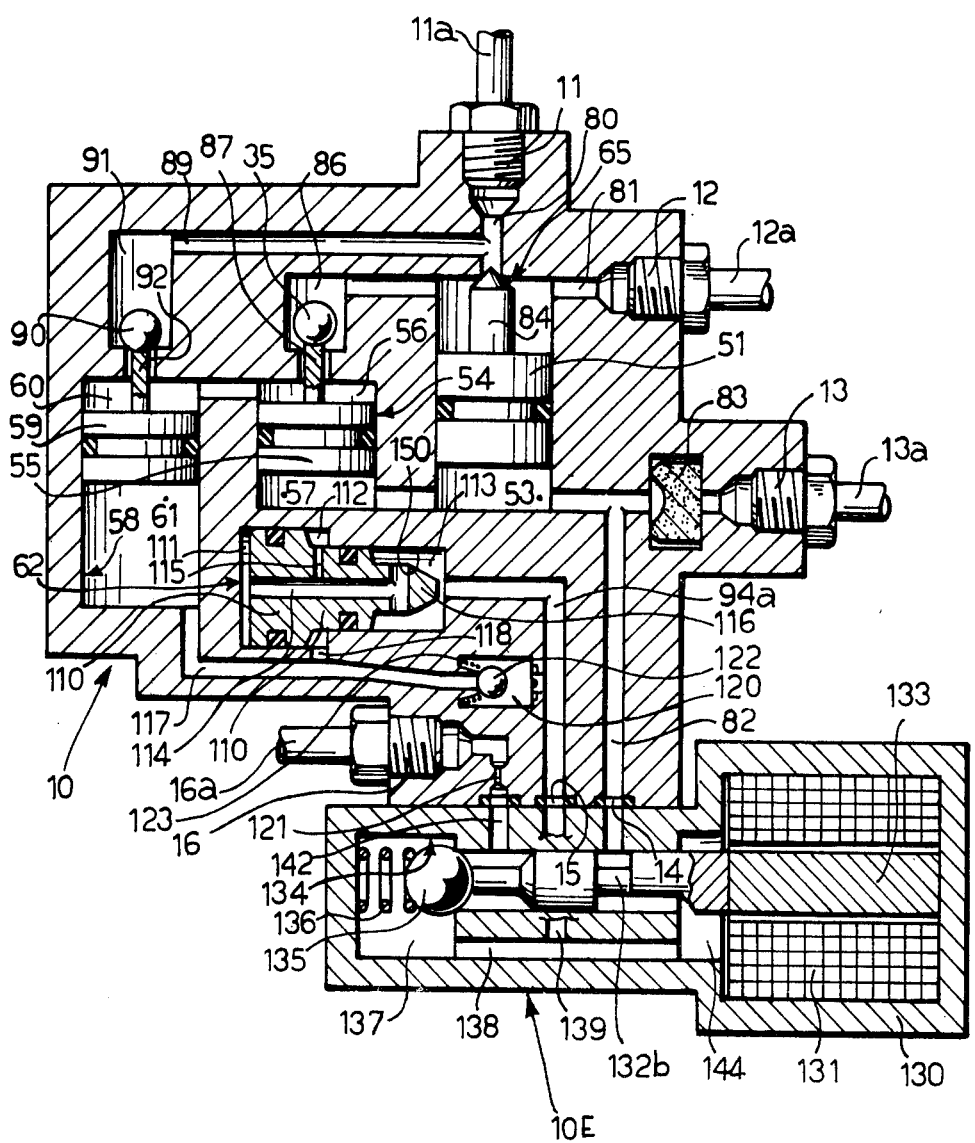
Figure 7:
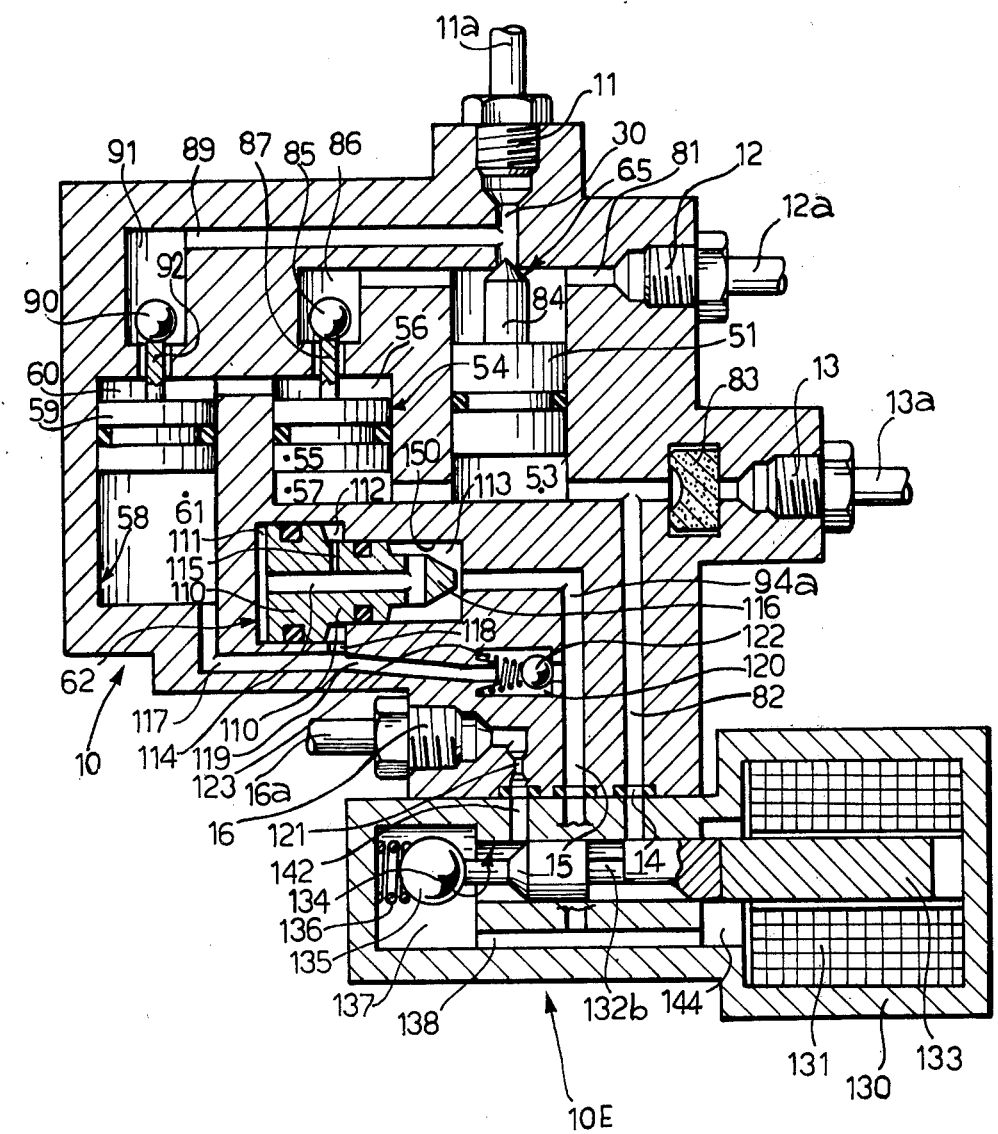
Figure 8:
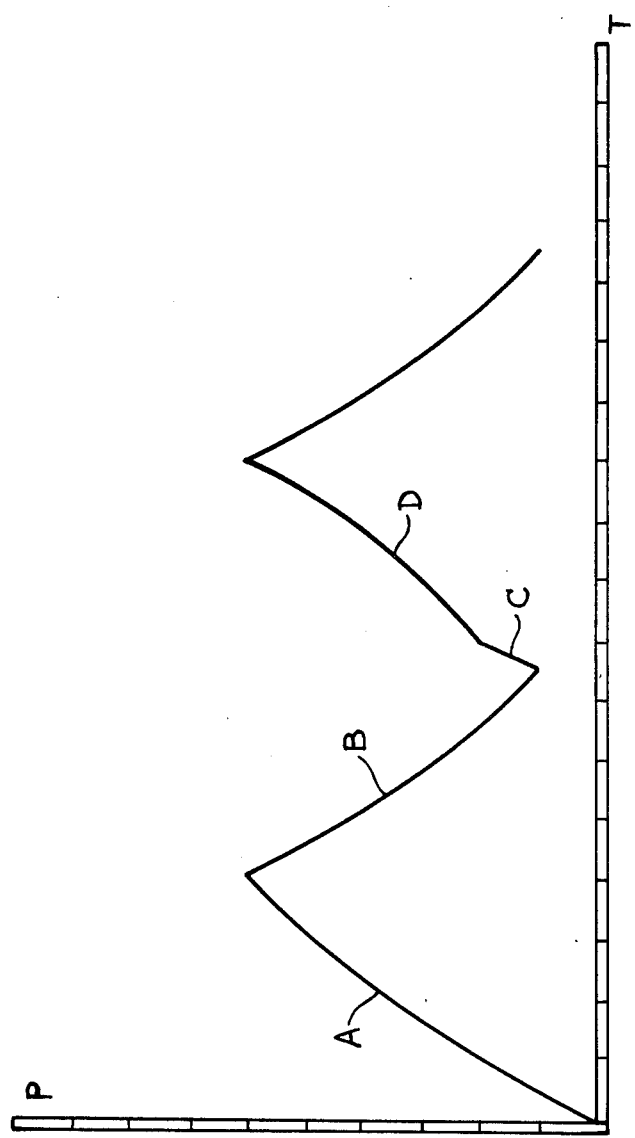

Two embodiments of the present invention will now be more particularly described, by way of example, with reference to the accompanying drawings, in which:

FIG. 1 is a schematic diagram illustrating a hydrodynamic braking system formed as an embodiment of the present invention;

FIGS. 2 to 4 schematically illustrate, in section, an hydraulic distributor suitable for use in the circuit of FIG. 1, in various operating positions;

FIGS. 5 to 7 illustrate, in section, a second embodiment of an hydraulic distributor suitable for use in the circuit of FIG. 1; and FIG. 8 is a diagram illustrating the variation of pressure with the time during operation of the embodiment of FIG. 1.

Referring now to the drawings, in FIG. 1 there are shown four wheels 1 of a motor vehicle provided with an hydro-dynamic anti-skid braking system which includes a reservoir 2 from which brake fluid is drawn by a volumetric pump 3, and a master cylinder 4 controlled by a brake pedal 6. The master cylinder 4 is connected to two hydraulic distributors 10 by two pipe lines 11a. The two hydraulic distributors are valve devices with associated solenoid operated valves IOE connected thereto by internal ports which will be described in greater detail below; they form part of identical front and rear braking circuits respectively. Each distributor 10 has an outlet port 12 connected by a brake pipe 12a to brake actuators 7 of the wheels 1 of the front or rear axle respectively. For convenience the inlet port 11 from the master cylinder 4 will be referred to as the first port of each distributor 10 and the outlet port 12 to the brake actuators will be referred to as the second port. Each distributor 10 also has a third port 13. The ports 13 of the two distributors 10 are connected together to a pipe 13a which is connected between the output of a volumetric pump 3 and a modulating valve 5 which is connected between the output of the pump 3 and a brake fluid reservoir 2 by a conduit 5a.

The modulating valve 5 is linked to the brake pedal 6 by a mechanical linkage indicated only by the broken line and acts to restrict the flow of fluid between the output of the pump 3 and the reservoir 2 in dependence on the force exerted on the brake pedal 6 thereby increasing the pressure in the pipe 13a in proportion to the brake pedal pressure. Each of the distributors 10 also has a fourth port 16 which is connected by a respective pipe 16a to the reservoir 2.

Associated with each of the wheels 1 is a respective sensor 9 for detecting the speed of each wheel; the outputs of the four sensors 9 are fed to processing means 8 which process the signals produced by the sensors 9 to determine the dynamic state of the wheels and thus control the solenoid valves 10E.

In the embodiment illustrated in FIG. 1 each distributor 10 is associated with the brake actuators of both wheels of a respective axle; it will be appreciated that there could be provided four distributors each associated with the brake actuator of an individual wheel.

Each hydraulic actuator 10 comprises a body within which there are formed four cylindrical cavities 50, 54, 58 and 67 each housing a respective piston 51, 55, 59 and 66. Each of the pistons separates the associated cavity into two chambers. The first cylindrical cavity 50 houses the piston 51 which separates the first cavity 50 into a first chamber 52 and a second chamber 53. The first chamber 52 of the first cylindrical cavity 50 communicates with the first or inlet port 11 through a passage 80 which is coaxial with the first cylindrical cavity 50. A passage 81 extending transverse the first cylindrical cavity 50 links the first chamber 52 of the first cavity 50 to the second or outlet port 12. The piston 51 in the first cylindrical cavity 50 has an axial projection 84 extending into the first chamber 52. The free end of the projection 84 is of conical form for entering and closing the passage 80 when the piston 51 is displaced toward the passage 80. The second chamber 53 of the first cavity 50 communicates through a passage 82 with an internal port 14 leading to the solenoid valve 10E, and through a filter 83 with the third port 13.

The second cavity 54 houses the piston 55 which separates it into first and second chambers 56 and 57 respectively. The first chamber 56 of the second cavity 54 communicates, via a valve 64 and a passage 86a with the first chamber 52 of the first cavity 50. The valve 64 comprises a ball 85 housed in a chamber 86 and cooperating with an axial projection 87 of the piston 55, which projects through the chamber 56. The second chamber 57 of the second cavity 54 is connected to the second chamber 53 of the first cavity 50 by a transverse passage 57a.

The third cavity 58 houses the piston 59 which separates it into first and second chambers 60 and 61 respectively. The first chamber 60 communicates, via a passage 60a with the first chamber 56 of the second cavity 54, and, via a second ball valve 63 and a passage 89, with the passage 80 leading to the first port 11. The ball valve 63 comprises a ball 90 housed in a chamber 92 and contacted by the end of an axial projection 92 of the piston 59 which traverses the first chamber 60 of the third cavity 58. The second chamber 61 of the third cavity 58 is connected through control means 62 to a further transfer port 15 communicating with the solenoid valve 10E.

The control means 62 comprise a fourth cavity 67 housing a fourth piston 66 which separates it into first and second chambers 68 and 69 respectively. The first chamber 68 of the fourth cavity 67 is in direct communication with the second chamber 61 of the third cavity 58 through a short passageway 61a. The second chamber 69 of the fourth cavity communicates via a ball valve 70 with the transfer port 15. The ball valve 70 is formed by a ball 93 housed in a chamber 94 in communication via a passage 94a with the transfer port 15, the ball 93 being contacted by the free end of an axial projection 95 of the plunger 66, which projection traverses the second chamber 69 of the fourth cavity 67.

The plunger 66 has a longitudinal transfer passage comprising a first part 96 of larger cross section and a second part 97 of restricted cross section. The plunger 66 is also provided with a communication passage 98 having an axial part opening into the first chamber 68 of the fourth cavity 67, the mouth of the opening being normally closed by a ball 100 pressed by a spring 101 which engages an apertured thrust element 102, and a radial part which communicates with a passage 103 in the body of the distributor, which communicates with the passage 94a leading to the transfer port 15. The mouth of the passage 103 is flared so that the communication passage 98 in the piston 66 remains in communication with the passage 103 in the body of the distributor even when the piston 66 is displaced during operation of the device.

The solenoid valve 10E comprises a body 130 housing a winding 131 and an axially movable core 133 to which is attached a valve slide 132 which slides in a cylindrical bore 134 of the housing 130. The valve slide 132 has an axial projection 132a at the end thereof remote from the core 133, which contacts a ball 135 housed in an end chamber 137 of the body 130 of the solenoid valve 10E. A spring 136 presses the ball 135 over the end of the bore 134 closing it. The valve slide 132 also has a portion 132b of reduced diameter which is positioned adjacent a transfer port 140 in the side wall of the body 130 of the solenoid valve 10E when the winding 131 is de-energised. The cylindrical bore 134 communicates with an enlarged chamber 144 at the end remote from the chamber 137 which houses the ball 135 and spring 136, and the two chambers 137 and 144 are also joined by a longitudinal passage 138 which extends alongside the cylindrical bore 134.

The wall of the body 130 of the solenoid valve also has two further transfer ports 141 and 142, the port 141 communicating with the transfer port 15 of the distributor and the port 142 communicating with a transfer port 143 in the distributor leading to the discharge port 16. The transfer port 141 also communicates with an annular passage 139 which is open to the bore 134 at one part of its circumference and open to the longitudinal passage 138 at another part of its circumference.

When the solenoid valve 10E is de-energized the valve slide 132 blocks communication between the port 141 and the bore 134 and although the chamber 137 is in communication with the transfer port 141 through the longitudinal passage 138 and the annular passage 139, the transfer port 142 is isolated by the ball valve 135. However, the transfer port 14 communicates with the transfer port 15 through transfer port 141 in the wall of the solenoid valve 10E, the annular passage 139, the longitudinal passage 138, the chamber 144 and the narrow part 132b of the valve slide 132 which permits communication with the transfer port 140 and thus the port 14. When the solenoid valve is energised the slide 132 is displaced to the left of the drawing displacing the ball 135 from the mouth of the bore 134 and both covering the transfer port 140 and filling the opposite end of the bore 134. The transfer port 15 now communicates with the transfer port 143 and thus with the discharge port 16.

The braking circuit described above operates as follows:

Referring to FIGS. 1, 2, 3 and 4, and to FIG. 8; when the engine of the motor vehicle is stopped, so that the volumetric pump 3 is not operating, any pressure generated by the master cylinder 4 upon depression of the brake pedal 6 enters the distributor 10 through the port 11 and passes along the passage 80 into the first chamber 52 of the first cylindrical cavity 50 from where it passes along the passage 81 to the second port 12 from where it is fed to the brake actuators 7 of the wheels 1 of the associated axle. The piston 51 in the cylindrical cavity 50 is pressed down (with reference to the orientation shown in the drawings) enlarging the first chamber 52 and carrying the projection 84 away from the mouth of the passage 80 so that a free flow of brake fluid from the first port 11 to the second port 12 can take place. Fluid also flows from the first chamber 52 along the passage 86a to the chamber 86 firmly closing the ball valve 85, and along the passage 89 which communicates with the passage 80, and into the chamber 91 firmly closing the ball valve 63.

When the engine of the motor vehicle is turning the volumetric pump 3 is operating: depression of the brake pedal 6 causes the modulating valve 5 to restrict the flow of fluid from the pump 3 to the reservoir 2 thus increasing the pressure of the fluid in the pipeline 13a. Fluid under pressure is thus fed to the port 13 of the distributor 10 from the pump 3 when the brake pedal 6 is depressed. From the port 13 fluid is fed through the filter 83, and into the second chambers 53 and 57 of the first and second cavities 50 and 54. Fluid also passes along the passage 82 and through the transfer port 14 into the solenoid valve 10E. If the solenoid valve is de-energised fluid is fed thereby to the transfer port 15 and from there along the passage 94a into the chamber 94 and also along the passage 103 to the passage 98 where, overcoming the biasing force of the spring 101 it displaces the ball 100 from the mouth of the passage 98 and flows into the chamber 68. At this stage the ball valve 70 is closed. Fluid under pressure flows through the passage 98 into the chamber 68 and from there through the passage 61a into the second chamber 61 of the third cavity 58. The pistons 59 and 55 are displaced in such a manner that the ball valves 63 and 64 are opened, and the piston 51 is displaced so that the projection 84 thereof obstructs the duct 80 restricting the flow of fluid from the master cylinder 4 directly into the first chamber 52 of the first cavity 50. Fluid from the master cylinder 4 can still reach the chamber 52 and hence the brake actuators 7, however, via the passage 89, the ball valve 63, the chamber 56, the passage 60a leading to the chamber 56, the ball valve 64, and the passage 86a.

If during braking one of the wheels 1 enters a skid or incipient skid condition this is detected from the speed signal of the sensors 9 by the processing means 8 which operates to energise the winding 131 of the appropriate solenoid valve 10E. This causes displacement of the valve slide 132 closing the port 14 and opening communication between the port 15 and the discharge port 16 as described above.

The pressure in the passage 98 then drops and the ball valve 100 closes. At the same time the pressure in the chamber 94 drops allowing the ball valve 70 to open. Brake fluid in the chamber 61 discharges through the chamber 68, the throttled passage 96, 97, the chamber 69, the ball valve 70, the chamber 94, the passage 94a leading to the transfer port 15 and through the solenoid valve 10E to the discharge port 16, and finally along the pipe 16a and into the reservoir 2. The piston 59 is now displaced to close the ball valve 63 and upon further displacement due to the discharge of pressure in the chamber 61 causes a drop in pressure in the chamber 56 and, since the valve 64 is open, also a temporary fall in the pressure in the chamber 52.

The piston 55 thus moves so as to open the valve 64 further and the piston 51 moves such as to close completely the mouth of the passage 80. Brake fluid under pressure in the brake actuators 7 can now flow back into the chamber 60 through the passage 81, the chamber 52, the passage 86a, the valve 64, the chamber 56 and the passage 60a. The pressure from the master cylinder 4, cannot discharge because the passage 80 and the valve 63 are fully closed. The brake pressure thus follows the part of its path illustrated in FIG. 7 by the line B of the graph. The brakes are thus released quite quickly, but not instantaneously, when they are close to being locked. When the speed of the wheel is such that the wheel is no longer about to skid the processing means 8 de-energises the solenoid valve 10E and the spring 136 thereof thus closes the ball valve 135 pushing back the valve slide 132 to its initial position. The discharge port 16 is thus closed and the connection between the transfer port 14 and the transfer port 15 reopened. Fluid under pressure from the pump 3 again arrives at the port 15 through the duct 82, the port 14 and the electrovalve 10E. When the pressure in the chamber is greater than that in the chamber 68 by a certain amount (determined by the strength of the biasing spring 101) the piston 66 is displaced allowing the ball valve 70 to close. This displacement of the piston 66, displaces a certain quantity of brake fluid into the chamber 61 lifting the piston 59 and displacing brake fluid along the brake pipe 12a to the brake cylinders 7. The braking pressure increases sharply by a small amount as shown by the line C of FIG. 7. From the moment when the ball valve 70 closes, the pressure in the chamber 68 and, therefore, in the chamber 61 increases more slowly as indicated in FIG. 7 by the line D of the graph. This slow increase is achieved as follows. The piston 66 is subjected on one side to the pressure in the chamber 68 reinforced with the force exerted by the biasing spring 101, and on the other side only to the pressure in the chamber 69. The pressure difference between the two chambers 68 and 69 tend to balance out due to the transfer of fluid through the throttled passage 96, 97. When the two pressures approach equality the force on the piston 66 due to the biasing spring 101 causes the piston 66 to move again causing the opening of the ball valve 70. The pressure in the chamber 69 then increases until it exceeds the combined pressure of the spring 101 and the pressure in the chamber 68, of the piston 66 then moves again allowing the ball valve 70 to close. This procedure is repeated each time increasing the pressure in the two chambers 68, 69 of the fourth cavity 67 and therefore the pressure in the second chamber 61 of the third cavity 58 and thus the braking pressure at the brake actuators 7 of the wheels 1 of the associated axle of the vehicle.

If the spring 101 breaks, the plunger 66 moves in such a manner as to close the valve 70. The passage 98 is no longer closed by the ball valve 100 and, therefore, the fluid under pressure can flow into the chamber 68 so that braking pressure can still be fed to the outlet port 12 and thus to the brake actuators 7 of the associated wheels 1. The operation of the anti-skid device will be different, however, in that initial brake release will be more rapid when the solenoid valve is energised, and likewise when it is de-energised the resumption of braking will be more rapid.

The alternative distributor illustrated in FIGS. 5, 6 and 7, differs from the distributor described in relation to FIGS. 2 to 4 only by the structure of the control means 62; the remaining parts of the distributor 10 and the solenoid valve 10E both in structure and in operation are entirely identical to that described in relation to FIGS. 2 to 4.

In the distributor illustrated in FIGS. 5 to 7 the control means 62 comprise a differential piston 110 sliding in a bore 150 having a first part of larger diameter and a second part of smaller diameter separated by a radial shoulder. The piston 110 separates the cavity 150 into three chambers 111, 112 and 113. The first chamber 113 has a smaller diameter than the other two chambers 111 and 112 which have the same diameter as one another. The two larger diameter chambers 111 and 112 lie on either side of the larger part of the differential piston 110, which latter has a longitudinal passage 114 providing free communication between the two end chambers 113 and 111. The piston 110 also has a transverse passage of small cross section communicating between the longitudinal passage 114 and the middle chamber 112. The end of the piston 110 which projects into the chamber 113 has a generally conical end part 116 which closes the mouth of the passage 94a when the piston 110 is displaced to the right of the drawing.

The chamber 61 is connected, through passages 117 and 118 to the intermediate chamber 112 of the control means 62. The passage 117 also communicates via a valve 120 with the passage 94a leading to the transfer port 15.

Another difference between the distributor 10 of FIGS. 5 to 7 and that of FIGS. 2 to 4 lies in the fact that the connection between the discharge port 16 and the solenoid valve 10E includes a passage 121 of restricted cross section serving as a throttle.

The valve 120 comprises a ball 122 which is held in place by a weak biasing spring 123 so that the passage 117 is not normally closed.

When the volumetric pump 3 is not operating, the operation of the distributor of FIGS. 5 to 7 is entirely identical to that of the distributor of FIGS. 2 to 4. When the pump is operating, however, the pressure increases in the chamber 61 more slowly than in the chamber 91. The valve 63 is thus closed when the brake pedal is first depressed, and is opened shortly afterwards when the pressure in the chamber 61 exceeds that in the chamber 60.

When the solenoid valve 10E is energised the chamber 61 is put in communication with the discharge port 16 as follows. The valve slide 132 moves to connect the transfer ports 15 and 143 closing the transfer port 14. Fluid in the chamber 61 can thus flow along the passage 117, through the valve 120, through the solenoid valve 10E and the throttled passage 121 to the discharge port 16. Because of the throttled passage 121 the discharge of braking pressure takes place in a controlled manner.

When the solenoid valve 10E is subsequently de-energised to close the communication with the discharge port 16, a certain quantity of fluid passes through the valve 120 before the ball 122 is displaced by the fluid flowing towards the chamber 61 to close the mouth of the passage 117. This causes a small, but quite rapid, increase in pressure in the chamber 61 and, as described in relation to the distributor of FIGS. 2 to 4, this causes a corresponding rapid increase in the braking pressure as indicated by the line C of FIG. 7.

The subsequent slow increase in braking pressure is achieved by the operation of the differential piston 110 which is subjected, on one side, to the pressure in the chamber 113, and on the other side, to the pressure in the chamber 111; since these pressures are equal and the diameter of the chamber 111 is greater than that of the chamber 113, the piston 110 will be displaced to the right of the drawing until its free end 116 closes the end of the passage 94a leading from the transfer port 15. After some delay some of the fluid under pressure in the chambers 111 and 113 flows through the throttled passage 115 into the chamber 112 until the pressure in the three chambers 113, 111 and 112 reaches the same value; the pressure in the passage 94a acting on the end face of the piston 110 is greater than this, however, and thus the piston is displaced to the left allowing more fluid to enter the chamber 113. The pressure in the chamber 111 quickly rises to that in the chamber 113 so that the piston 110 is again displaced to close the mouth of the passage 94a. Equalisation of the new pressure in the chambers 111, 113 again takes place following which the piston 10 is again displaced to open the passage 94a and this process repeats, with the pressure in chambers 111, 112 and 113 gradually increasing. The pressure in chamber 112 is communicated to the chamber 61 through the passages 117 and 118 giving rise as described above to a gradual increase in braking pressure at the brake actuators 7 as shown by the line D of the graph illustrated in FIG. 7.

We claim:

1. In a hydro-dynamic anti-skid braking system, for motor vehicles, of the type comprising:
 a master cylinder,
 a brake pedal controlling said master cylinder,
 a plurality of brake actuators at least one for each wheel of the vehicle,
 a reservoir of brake fluid,
 a modulating valve controlled by said brake pedal,
 a volumetric pump operating to circulate brake fluid from said brake fluid reservoir through said modulating valve controlled by said brake pedal and back to said reservoir,
 at least one hydraulic distributor having a solenoid valve and first, second, third and fourth ports,
 means connecting said first port to said master cylinder,
 means connecting said second port to said brake actuators of at least some of the wheels of said vehicle,
 means connecting said third port to the output side of said volumetric pump, and
 means connecting said fourth port to said reservoir,
 sensor means associated with each of said wheels of said vehicle, operating to detect the speed of said wheels and producing respective output signals,
 a processing circuit,
 means feeding said output signals from said sensor means to said processing circuit which produces an output signal whenever any of the said wheels of said vehicle is in a skid or incipient skid state,
 means feeding said output signal to said solenoid valve of said hydraulic distributor whereby to energise said solenoid valve whenever one of said wheels of said vehicle is in a skid or incipient skid state, whereby to control said distributor to release the brakes when a skid or incipient skid is detected, the improvement wherein,
 said hydraulic distributor comprises a body having first, second and third transfer ports communicating with said solenoid valve which acts to connect said first and second transfer ports together when de-energised and to connect said second and third transfer ports together when energised, said hydraulic distributor body also having:
 a first cavity, a first piston in said first cavity separating it into a first chamber communicating with said first and second ports and a second chamber communicating with said third port and with said first transfer port,
 a second cavity,
 a second piston in said second cavity separating it into first and second chambers,
 a first control valve connecting said first chamber of said second cavity with said first chamber of said first cavity, said second chamber of said second cavity communicating with said second chamber of said first cavity,
 a third cavity,
 a second control valve,
 control means,
 a third piston in said third cavity separating it into first and second chambers the first communicating with both said first chamber of said second cavity and, via said second control valve with said first port, and the second communicating with said second transfer port via said control means which permit a controlled flow of fluid from said second chamber of said third cavity through said second and third transfer ports to said fourth port when said solenoid valve is energised,
 a projection on said first piston serving as a shutter to close communication between said first port and said first chamber of said first cavity when the pressure in said first chamber of said first cavity is lower than the pressure in said second chamber of said first cavity, said first and second control valves acting to prevent the flow of fluid into said first chambers of said second and third cavities respectively when the pressure in these is higher then the pressure in said second chambers of said second and third cavities respectively.

2. The hydro-dynamic braking system of claim 1, wherein said control means comprise:
 a third control valve,
 a fourth cavity in said body of said distributor,
 a fourth piston in said fourth cavity separating it into first and second chambers, the first chamber communicating with said second chamber of said third cavity and the second communicating via said third control valve with said second transfer port, said third control valve operating to close such communication when the pressure in said second chamber of said fourth cavity exceeds by a predetermined amount the pressure in said first chamber of said fourth cavity.

3. The hydro-dynamic braking system of claim 1, wherein said control means comprise a fourth cavity having a larger part and a smaller part, a differential piston having a larger part and a smaller part housed in said fourth cavity and separating it into three chambers, a first chamber at the larger end of said cavity, a second chamber of the same diameter as said first chamber at an intermediate position at a shoulder between said larger and smaller parts of said cavity, and a third chamber at said smaller and of said cavity,
 a passage in said body connecting said third chamber of said fourth cavity with said second transfer port,
 a longitudinal passage in said differential piston permitting free communication between said first and third chambers,
 a transverse duct of narrow cross section in said differential piston permitting throttled communication between said longitudinal passage and said intermediate chamber;
 means at the smaller end of said differential piston for closing said passage leading to said second transfer port,
 means connecting said intermediate chamber of said fourth cavity with said second chamber of said third cavity, and
 a fourth control valve connecting said intermediate chamber of said fourth cavity with said second transfer port.

4. The hydro-dynamic braking system of claim 2, wherein said fourth piston is provided with a longitudinal hole having a constricted part, which permits communication between said first and second chambers of said fourth cavity.

5. The hydro-dynamic braking system of claim 4, wherein said fourth piston is also provided with a transfer passage having a part extending axially of the piston and a part extending radially of the piston,
   a passage in the body of said distributor communicating with said radial part of said transfer passage in said fourth piston and leading to said second transfer port.

6. The hydro-dynamic braking system of claim 5, wherein said first chamber of said fourth cavity houses a biasing spring which acts on a thrust element to press a ball over the end of said axial part of said transfer passage in said fourth piston.

7. The hydro-dynamic braking system of claim 3, wherein said fourth control valve is formed by a ball and a light spring which allows the passage of brake fluid from said intermediate chamber of said fourth cavity towards said second transfer port but prevents the flow of brake fluid in the opposite direction.

* * * * *